US012706414B2

(12) United States Patent
Schmitz et al.

(10) Patent No.: US 12,706,414 B2
(45) Date of Patent: Aug. 11, 2026

(54) PLUG CONNECTOR

(71) Applicant: Weidmüller Interface GmbH & Co. KG, Detmold (DE)

(72) Inventors: Till Schmitz, Detmold (DE); Peter Stuckmann, Lage (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 435 days.

(21) Appl. No.: 18/355,023

(22) Filed: Jul. 19, 2023

(65) Prior Publication Data

US 2024/0030646 A1 Jan. 25, 2024

(30) Foreign Application Priority Data

Jul. 19, 2022 (DE) ..................... 10 2022 118 013.1

(51) Int. Cl.
*H01R 13/514* (2006.01)
*H01R 13/15* (2006.01)
*H01R 13/516* (2006.01)
*H01R 13/629* (2006.01)
*H01R 13/639* (2006.01)

(52) U.S. Cl.
CPC ........... *H01R 13/514* (2013.01); *H01R 13/15* (2013.01); *H01R 13/516* (2013.01); *H01R 13/62955* (2013.01); *H01R 13/639* (2013.01)

(58) Field of Classification Search
CPC .... H01R 13/514; H01R 13/15; H01R 13/516; H01R 13/62955; H01R 13/639; H01R 4/4821; H01R 4/483; H01R 9/223; H01R 9/2491; H01R 9/26; H01R 11/05; H01R 13/502; H01R 35/04
See application file for complete search history.

(56) References Cited

U.S. PATENT DOCUMENTS

| | | | | |
|---|---|---|---|---|
| 11,916,345 B2 * | 2/2024 | Böcker | ................ | H01R 13/193 |
| 2022/0320759 A1 * | 10/2022 | Böcker | ................ | H01R 13/193 |
| 2024/0030628 A1 * | 1/2024 | Schmitz | ............... | H01R 9/2491 |
| 2024/0030640 A1 * | 1/2024 | Schmitz | ............... | H01R 9/2408 |
| 2024/0030646 A1 * | 1/2024 | Schmitz | ................. | H01R 13/15 |
| 2025/0183561 A1 * | 6/2025 | Schmitz | ................. | H01R 4/483 |

FOREIGN PATENT DOCUMENTS

| | | | | |
|---|---|---|---|---|
| DE | 102011056986 A1 * | 6/2013 | ............. | H01R 4/485 |
| DE | 202019105075 U1 * | 12/2020 | ............. | H01R 4/483 |
| EP | 0 984 513 A2 | 6/1999 | | |

* cited by examiner

*Primary Examiner* — Abdullah A Riyami
*Assistant Examiner* — Nader J Alhawamdeh
(74) *Attorney, Agent, or Firm* — Laubscher & Fretwell, P.C.

(57) ABSTRACT

A plug connector has a housing made of an electrically non-conductive material such as a plastic which has a front side and a rear side. The housing has at least two insertion openings for conductor ends. The first and second insertion openings are in connection with respective first and second housing chambers. The first and second housing chambers have respective first and second connection devices. The housing further has a first housing half and a second housing half, wherein when rotated clockwise by 180° in a point of symmetry, the first housing half can be reproduced on the second housing half such that the housing is formed substantially or entirely in a rotationally symmetrical manner with regard to the point of symmetry or an axis of symmetry.

26 Claims, 7 Drawing Sheets

FIG. 3h
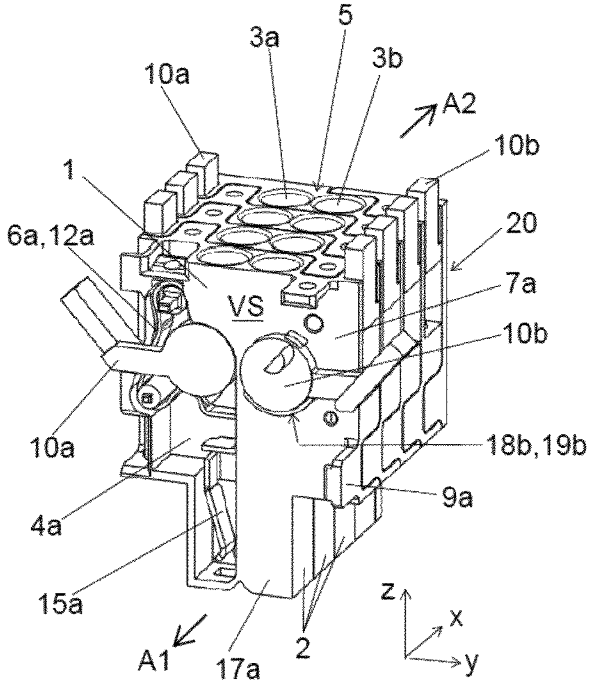
FIG. 3i
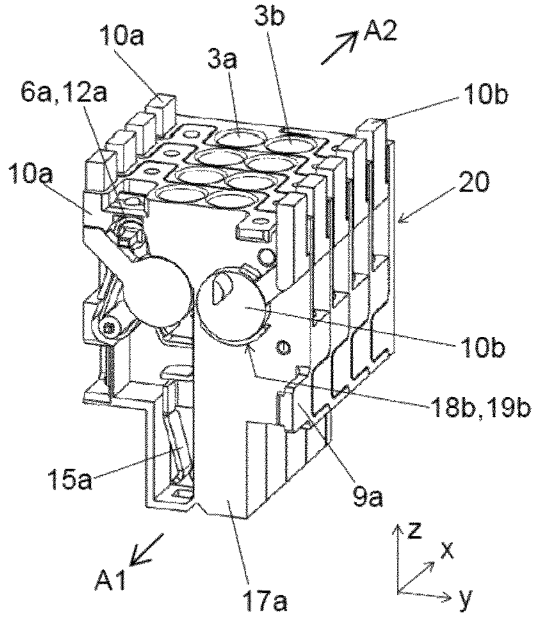
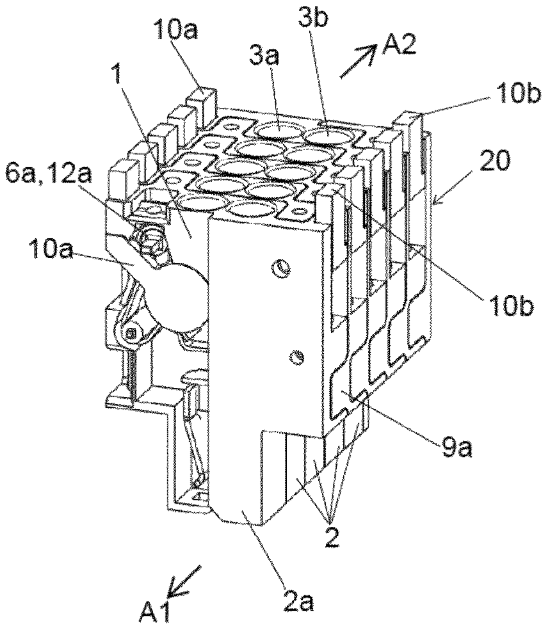
FIG. 3j
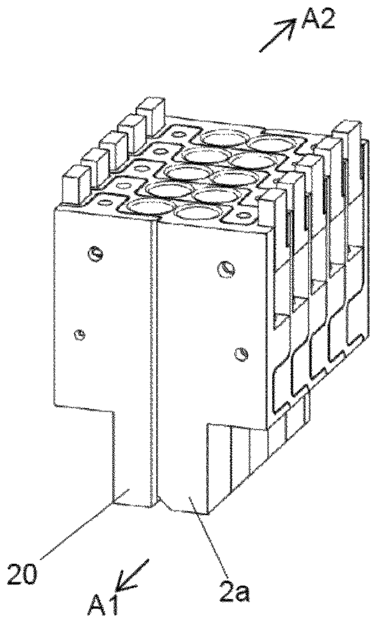
FIG. 3k

PLUG CONNECTOR

This application claims priority of DE 10 2022 118 013.1 filed on Jul. 19 2022, the entire content of which is incorporated herein by reference.

BACKGROUND OF THE INVENTION

The invention relates to a plug connector for contacting a mating plug connector.

A wide variety of such plug connectors are known from the prior art. In this application, the term "plug connector" includes a plug connector of panel-shaped design which can be plugged together with a corresponding mating plug connector or which can be attached, for example soldered, onto a printed circuit board. When a number of plug connectors are joined together and mechanically connected via a connecting arrangement into a rail shape, they form a higher-level multipanel plug connector.

According to EP 0 984 513 A2, a plug connector can have an insulating plastic housing with at least two connection devices for incoming electrical cables and at least two pin or socket contacts, which are each connected to the connection devices and are able to be connected with the mating plug connector.

Opposite the joining-on direction, the plastic housing of the plug connector has a housing wall. There is no housing wall in the joining-on direction, which means that it is open. The next plug connector is joined on here. The plastic housing of the final joined-on plug connector is closed in the joining-on direction by an end plate. This housing construction technique is called "panel construction technique". The panel construction technique is a design which saves construction space and material.

The plug connector according to EP 0 984 513 A2 is, however, not formed optimally with regard to the clearances and creepage distances of the conductive components, in particular the connection devices. In addition, it would be desirable to use more identical parts when manufacturing them.

SUMMARY OF THE INVENTION

It is an object of the present disclosure to provide a plug connector, in particular for contacting a mating plug connector, which has a housing made of an electrically non-conductive material such a plastic and which has a front side and a rear side. The housing has at least two insertion openings for conductor ends. The first and second insertion openings are in connection with respective first and second housing chambers. The housing chambers have respective connection devices. The housing further has first and second housing halves, wherein, rotated in a point of symmetry or an axis of symmetry, the first housing half can be reproduced on the second housing half, such that the housing is formed substantially or entirely in a rotationally symmetrical manner with regard to the point of symmetry or an axis of symmetry on which the point of symmetry is situated.

In this way, there is made available a plug connector with optimized clearances and creepage distances, during the manufacturing of which it is also possible to employ many identical parts. This is because the housing chambers and the connection devices arranged therein are arranged distant from one another on opposite sides of the housing in the two housing halves which are turned to one another. This ensures large, or optimized, clearances and creepage distances. In addition, the connection devices can be produced on both sides from identical parts and do not have to be formed symmetrically in two versions for the left and right housing halves, as is the case with the prior art.

Furthermore, the joining-on other plug connectors, starting from a first plug connector, is made possible in two different joining-on directions, as a result of which the plug connector is advantageously flexible in use.

It is particularly advantageous if the two housing halves are oriented to one another, turned by 180°, and are preferably integrally connected to one another.

In a particularly preferred embodiment of the invention, it is advantageously envisaged that the point of symmetry be on an imaginary point of intersection of two center lines which respectively bisect the length and the width of the upper side of the housing.

In a further preferred embodiment, the housing has on its front side a first housing wall which closes the second housing chamber, with the first housing chamber remaining open, and has on its rear side a second housing wall which closes the first housing chamber, with the second housing chamber remaining open. As a result the clearances and creepage distances are optimized, although the required installation space is virtually not increased.

In another embodiment, the respective insertion opening is arranged on the upper side of the housing.

In an additional embodiment, the connection devices of the two halves of the housing are also arranged in the respective housing chamber in a rotationally symmetrical manner relative to one another. As a result, the two connection devices are oriented to an opposite outer side of the housing, reducing the danger of undesired electrical shunts.

In yet another embodiment, the first housing chamber, on the front side of the housing, can be closed via an additional, preferably geometrically identical, plug connector. This plug connector is joined by its housing on the front side of the plug connector in a first joining-on direction, onto the housing of the first plug connector. Furthermore, it is preferable for the second housing chamber, on the rear side of the housing, to be closed via an additional, preferably geometrically identical, plug connector that is joined on the rear side of the plug connector, which is joined on in a second joining-on direction onto the housing of the first plug connector. As a result, the panel construction technique, which saves construction space and material, is in each case implemented for two joining-on directions.

According to an additional preferred embodiment, each housing half has one or more (preferably two) form-fitting elements, which are formed such that, when the plug connectors are joined together, form-fitting elements of adjacent housings engage one another substantially in a form-fitting and secure manner.

In yet another preferred embodiment, each housing half has at least one locking arrangement, in particular a first locking arrangement and a second locking arrangement, wherein the first locking arrangement is a locking hook and the second locking arrangement is a latch. When the plug connectors are joined together, locking arrangements of adjacent housings engage one another in a locking manner.

As a result, there arises an overall robust, structurally simple mechanism for attaching the housings of the plug connectors without tools, which are joined to one another with the principle of rotational symmetry of the housing halves being maintained.

Furthermore, it is preferable for the respective connection device to be designed in each case as a spring-loaded direct plug contact. As a result, there arises a contacting of the conductor ends in a manner which can be performed without tools and thus in an advantageously simple manner.

According to an additional embodiment, the connection devices have an actuation device which prestresses a contact limb of a contact spring of the connection device. As a result, the actuation device functions without tools and thus in an advantageously simple manner.

In another embodiment, the actuation device is formed as a lever which is pivotably mounted in the housing, or as a sliding element or as a combination of these elements.

According to another preferred embodiment, a first busbar section is lengthened and is connected to a plug contact at which the plug connector can be contacted with a mating plug connector or a different electrical appliance. In this manner, through a function integration, a compactly constructed contact is created for connection to the mating plug connector. The additional plug contact for connecting to a corresponding plug contact of a mating plug connector can be configured as a pin contact, as a blade contact or as a socket contact, e.g. as a contact tulip made up of two busbar sections or the like. It can be provided in an extension of the insertion direction for the conductors, or at an angle to it, e.g. at a right angle.

In a further embodiment, it a row of plug connectors is respectively terminated by a cover plate which covers the first housing chamber in a first joining-on direction and the second housing chamber in the second joining-on direction.

As a result, a structurally simple and therefore advantageous closure of the housing is made available.

In an additional embodiment, the geometry of a housing wall thickening is such that it forms a bearing site for a pivot bearing of the actuation device. As a result, a bearing site for the actuation device is created in a structurally simple manner.

Furthermore, according to one configuration, a respective lever of the actuation device is oriented in a starting position parallel to the housing or at an angle to the housing. These two configurations can be alternated in a row of plug connectors, which facilitates actuation.

BRIEF DESCRIPTION OF THE DRAWINGS

The invention is described in greater detail hereafter with reference to the drawings by means of exemplary embodiments, wherein further advantageous variants and configurations are also discussed. It should be emphasized that the exemplary embodiment discussed hereafter are not meant to describe the invention exclusively but rather, on the contrary, variants and equivalents which are not depicted are also considered. In the drawings:

FIG. 3*h* is a perspective view of joined-together plug connectors from FIG. 3*a* with the connection device being prestressed by the actuation device and the actuation device being in the home position;

FIG. 3*i* is a perspective view of joined-together plug connectors from FIG. 3*a* with the connection device being prestressed by the actuation device and the actuation device being in the home position;

FIG. 3*j* is a perspective view of joined-together plug connectors according to FIG. 3*i* with a housing end forming the end of the row; and FIG. 3*k* is a perspective view of joined-together plug connectors according to FIG. 3*a* with an open side of the housing end being closed with an end plate.

DETAILED DESCRIPTION

Figure 1A:
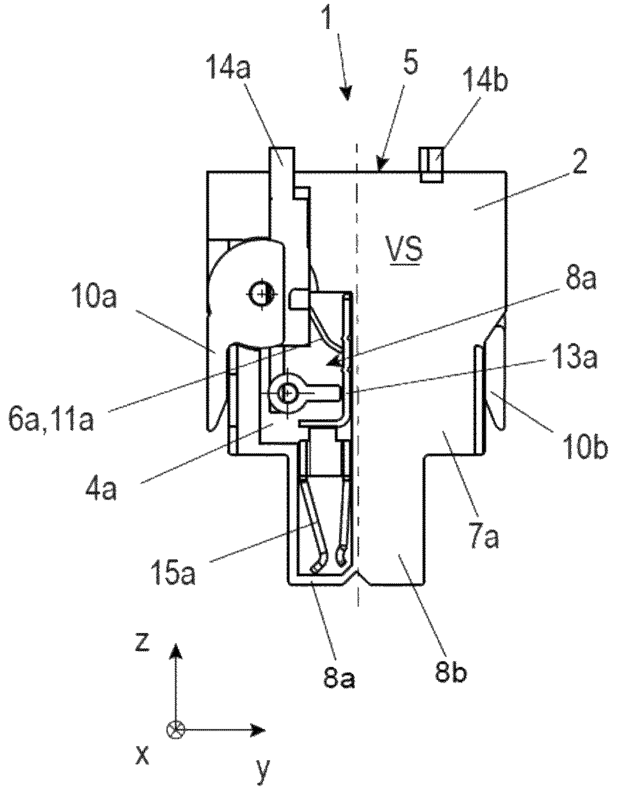
FIG. 1*a* is a front view of a first embodiment of a plug connector according to the invention.

The terms used hereafter such as "vertical", "perpendicular", "horizontal", "top", "bottom", "right", "left" relate to the respective drawing. A spatial coordinate system in each drawing can be used for additional orientation.

FIGS. 1*a*-1*f* show a substantially panel-like single-panel plug connector 1 which can be plugged together with a mating plug connector, with the mating plug connector (not depicted here) which can be formed as a section of a series terminal, an electrical structural component or an appliance, to name a few. The mating plug connector may be able to be joined onto a mounting rail, a circuit board or the like. The respective plug connector 1 can be joined together with further single-panel plug connectors 1 of an identical or substantially identical design, so that there then arises a higher-level multipanel plug connector 100 made up of a number of single-panel plug connectors 1 joined together. Hereafter, the single-panel plug connector 1 or plug connector panel are both referred to as a "plug connector" for short.

The multipanel plug connector 1 from FIGS. 1*a*-1*f* preferably has at least one or more plug connector panels or plug connectors. These each have a substantially or precisely rotationally symmetrical housing 2 which is preferably made of an electrically non-conductive material, such as plastic.

Here, the term "rotationally symmetrical" means that the housing 2 is mirrored at only one single point of symmetry S, and in doing so reproduces itself. In FIGS. 1*c*, 2*c* and 3*c*, the point of symmetry S is situated on an imaginary point of intersection of two center lines M1, M2, which respectively bisect the length L and the width B with regard to an upper side 5 (in association with the coordinate system in FIGS. 1*a*, 1*b*, 1*c* parallel to an x-y plane) of the housing 2. This applies to any plane parallel to the x-y plane with regard to the entire housing 2, such that there arises parallel to the z-axis an imaginary axis of symmetry through the points of symmetry S on these planes.

In other words, if a first housing half 8*a*, in the point of symmetry or axis of symmetry is rotated theoretically by 180° in the clockwise direction, this first housing half 8*a* is reproduced on a second housing half 8*b*. In this regard, the housing 2, like the first housing half 8*a* and the second housing half 8*b*, can also be referred to as inversion-symmetrical or rotationally symmetrical with regard to the point of symmetry S.

The plug connector 1 is envisaged to link at least two conductor ends (not shown here) and to connect them respectively to a plug contact in a conductive manner.

For this purpose, the housing 2 has at least two, and shown here precisely two, insertion openings 3*a*, 3*b* for respective conductor ends. The first insertion opening 3*a* and the second insertion opening 3*b* are arranged here on the upper side 5 of the housing 2. They could also be arranged at an angle or laterally. The respective insertion opening 3*a*, 3*b* extends into a first housing chamber 4*a* and a second housing chamber 4*b*.

The first housing chamber 4*a* here substantially occupies the first housing half 8*a* and the second housing chamber 4*b* substantially occupies the second housing half 8*b*.

The first housing chamber 4*a* has a first connection device 6*a* and the second housing chamber 4*b* has a second connection device 6*b*. The connection devices 6*a*, 6*b* are arranged here in the respective housing chamber 4*a*, 4*b* in a mirror-symmetrical or also rotationally symmetrical manner relative to one another.

As depicted in FIG. 1, the housing 2 of the plug connector 1 has on its front side VS a first housing wall 7*a* which closes only the second housing chamber 4*b* which is arranged in FIG. 1*a* on the right. In contrast, the first housing chamber 4*a*, which in FIG. 1*a* is arranged on the left on the front side VS of the housing 2, is open such that the first connection device 6*a* is visible. The first housing chamber 4*a* is thus outwardly open on the front side VS of the housing 2.

The housing chambers 4*a*, 4*b* and the connection devices arranged therein, and overall the two metal structural components, are thus arranged a far distant from one another on opposite sides of the housing in the two housing halves, which ensures large, or optimized, clearances and creepage distances.

As shown in FIG. 1*c*, the housing 2 of the plug connector 1 has on its rear side RS a second housing wall 7*b* which likewise closes only one of the two housing chambers, namely the first housing chamber 4*a*. The first housing chamber 4*a*, arranged to the right in the direction of view onto the rear side RS of the housing 2, is arranged in one housing half. In contrast, the second housing chamber 4*b*, which is arranged to the left in the direction of view onto the rear side RS, is open. The second housing chamber 4*b* is thus outwardly open on the rear side RS of the housing 2 and is arranged in the other housing half.

Figure 1B:
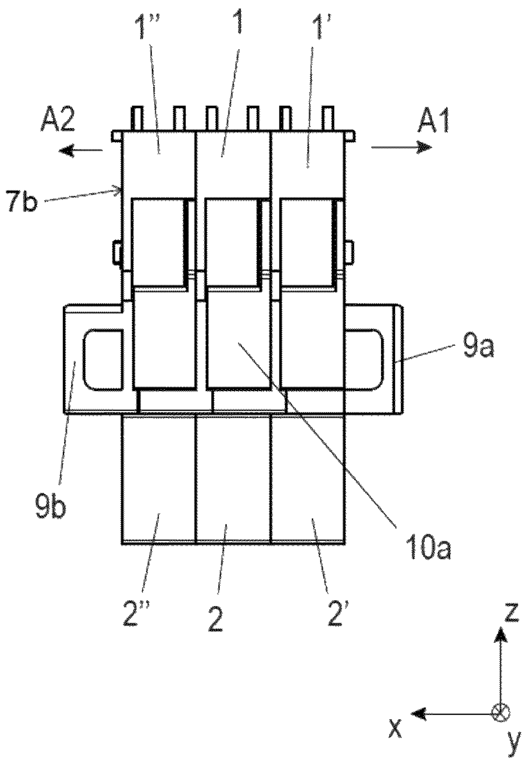
FIG. 1*b* is a side view of joined-together plug connectors from FIG. 1*a;*
Figure 1C:
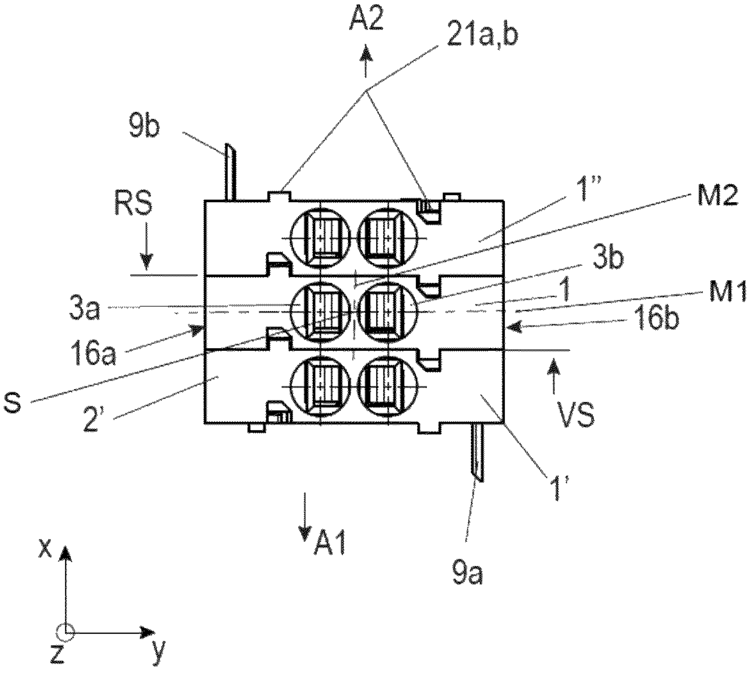
FIG. 1*c* is a top view of joined-together plug connectors from FIG. 1*a;*
Figure 1D:
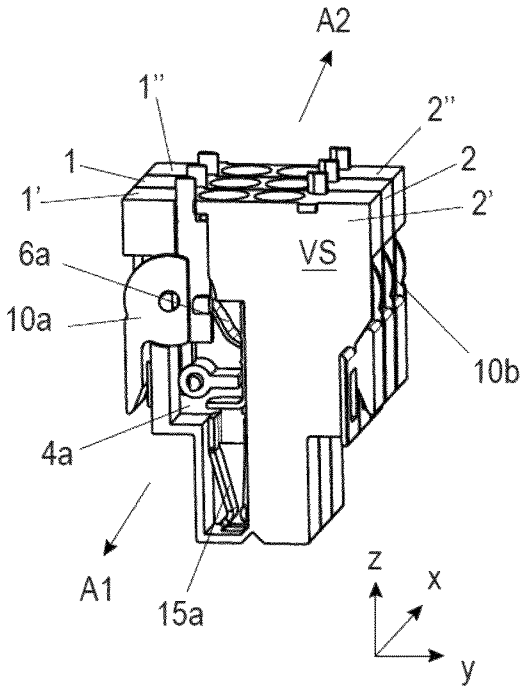
FIG. 1*d* is a perspective view of joined-together plug connectors from FIG. 1*a* with an actuation device in a starting position.
Figure 1E:
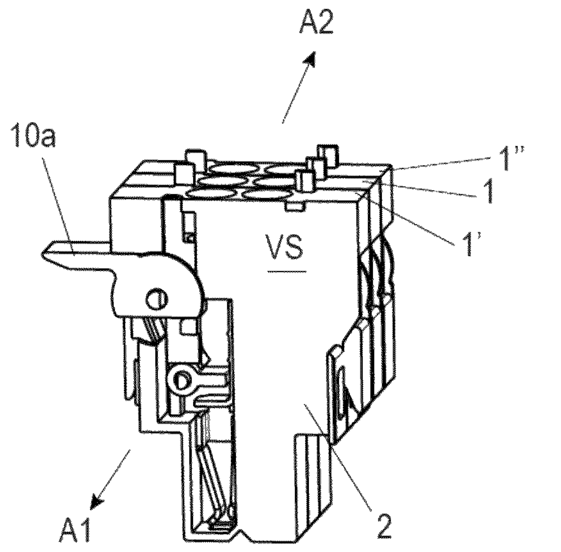
FIG. 1*e* is a perspective view of joined-together plug connectors from FIG. 1*a* with an actuation device in a prestressed position.
Figure 1F:
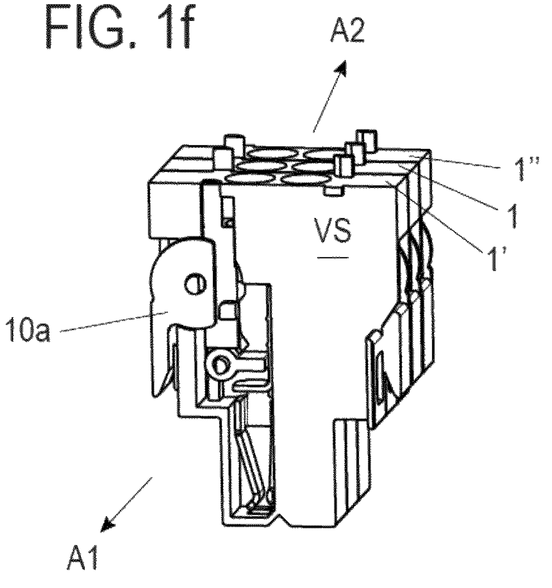
FIG. 1*f* is a perspective view of a joined-together plug connectors from FIG. 1*a* with an actuation device for the connection device.

Referring to FIGS. 1*a* and 1*b*, the first housing chamber 4*a* on the left front side VS of the housing 2 is closed in that a second, geometrically identical plug connector 1' is joined on the housing in a negative x-direction with its housing 2' on the front side VS of the plug connector 1.

Analogously to this, the second housing chamber 4*b* is closed on the rear side RS of the housing 2, in that a third, geometrically identical plug connector 1" is joined on with its housing 2" on the rear side RS of the plug connector 1 in the positive x-direction to the housing 2 of the first plug connector 1.

Through the housing 2, which is open over half the side on both the front side VS and on the rear side RS, the plug connector 1 according to FIGS. 1*a*-1*f* can advantageously be joined together in two different joining-on directions A1, A2.

The first joining-on direction A1 extends in the negative x-direction with regard to the coordinate system in FIG. 1*a*. The second joining-on direction A2 extends in the positive x-direction with regard to the coordinate system in FIG. 1*a*. There arises a flexible, simple assembly and a high degree of use of identical parts irrespective of the joining-on direction A1, A2 in which the next plug connector 1 is intended to be joined on since the geometrically identical housing 2 can be used.

In order for the plug connectors 1, 1', 1" to be joined on in the correct orientation, the housing 2 has form-fitting elements 21*a*, 21*b* which also serve as joining aids. The form-fitting elements 21*a*, 21*b* are formed such that form-fitting elements of adjacent housings or plug connectors aligned in a row of plug connectors 1, 1', 1" as a pin and recess, substantially engage one another in a substantially form-fitting manner. The plug connectors 1, 1', 1" therefore cannot be incorrectly constructed without a gap between the housings 2, 2', 2". In this manner, the form-fitting elements 21*a*, 21*b* prevent the plug connectors 1, 1', 1" from being joined together in the wrong way and make the row secure.

In order to connect the joined-together plug connectors 1, 1', 1", or their housings 2, 2', 2", to one another, the respective housing 2, 2', 2" furthermore has a first locking arrangement 9*a* and a second locking arrangement 9*b*.

Here, the first locking arrangement 9*a* is arranged to the right on the front side VS of the housing 2 in FIG. 1*a* and is likewise arranged to the right on the rear side RS of the housing 2. The second locking arrangement 9*b* or mating locking arrangement (not depicted here) is thus located to the left on the front side VS of the housing 2 and likewise to the left on the rear side RS in the direction of view; see also in this regard FIG. 1*b* and FIG. 1*c*. The first locking arrangement 9*a* can be designed as locking hooks and the mating locking arrangement can be designed as latches.

The two connection devices 6*a*, 6*b*, which are also referred to as a metal structural component, are designed here as pressure-spring connections and preferably as direct plug-in connections. The design of the connection devices 6*a*, 6*b* as a pressure-spring connection is advantageous because it makes it possible to accomplish contacting without a tool, and also releasing without a tool, but this is not mandatory. Alternatively, it is possible to also envisage other connection types, such as connections in tension spring technology, screw connections, in particular tension spring connections or insulation-penetrating connections. Furthermore, a number of conductor connections per housing 2 can also be used.

The respective connection device 6*a*, 6*b* can also have an actuation device 10*a*, 10*b*, to prestress a contact limb 11*a*, 11*b* of a contact spring 12*a*, 12*b* of the connection device 6*a*, 6*b*. Here, the actuation device 10*a*, 10*b* has a lever which is pivotably mounted in the housing 2. The lever can act directly on the contact springs 12*a*, 12*b* or also via a sliding element. It is also possible for only a sliding element to be provided as the actuation device. The contact spring 12*a*, 12*b* can optionally be prestressed into an open position, such that it is releasable by a conductor which is introduced into the housing, which releases the prestressing and is then contacted.

An electrical contact to the busbar is produced by inserting the respective (stripped) conductor ends in the z-direction into the respective insertion opening 3*a*, 3*b* as far as a clamping and contacting region. In this case, prestressing the contact spring 12*a*, 12*b* is released, as a result of which the contact limb 11*a*, 11*b* presses the respective conductor end against the first busbar section 13*a*, 13*b* of the busbar. The contact can be released again by the actuation device, here the lever and sliding element, through which pressure can be exerted onto the contact limb 11*a*, 11*b* of the contact spring 12*a*, 12*b* in order to once again open and/or prestress the contact spring 12*a*, 12*b* to contact the conductor end (not depicted here). This is by way of example, but not mandatory. The direct plug-in connection could also be formed as a direct plug-in connection which cannot be locked in an open position.

The connection device 6*a*, 6*b* could also be formed in another connection technology, such as a tension spring terminal or IDC terminal or a screw terminal (not depicted here).

The first busbar section 13*a*, 13*b* extends here in each case downwards in the vertical direction (i.e. in the negative z-direction with regard to the coordinate system) and forms, together with a respective second busbar section 15*a*, 15*b* a plug contact, which in this case is a tulip contact or socket contact, by which the plug connector 1 can be plugged onto the mating plug connector. The plug contact can also be a contact blade or a pin contact. In addition, the mating plug connector accordingly has in each case a geometrically corresponding plug contact (not depicted here). The contact between the plug connector 1 and the mating plug connector can also be designed differently. For example, pin contacts or mixed forms with pin and tulip contacts and/or shield contacts are also conceivable.

To terminate a row of plug connectors 1, a cover plate 20 is provided (see FIG. 3*a*), which, in the first joining-on direction A1, covers the first housing chamber 4*a* arranged to the left on the front side VS of the housing 2. In the second joining-on direction A2 in the direction of view onto the rear side RS, it covers the second housing chamber 4*b*.

In this way, a plug connector is made available which makes it possible to join on additional plug connectors 1', 1" in two joining-on directions and accordingly is flexible in use. Furthermore, the conductor connection takes place from the housing upper side 5 (see in particular FIG. 1*c*, and FIG. 1*d* to FIG. 1*f*), such that the conductor connection is spatially separated from the actuation device 10*a*, 10*b* for the respective connection device 6*a*, 6*b*, which is also advantageous. Furthermore, the two connection devices 6*a*, 6*b* are oriented to an outer narrow side 16*a*, 16*b* of the housing 2, as a result of which the danger of undesired electrical shunts is advantageously reduced.

FIGS. 2*a* to 2*e* depict a second exemplary embodiment of the plug connector 1.

The plug connector 1 according to these embodiments also has a housing 2 which is substantially formed in a rotationally symmetrical manner of two housing halves, and which has it at least two, and here precisely two, insertion openings 3*a*, 3*b* for the conductor ends. The respective insertion opening 3*a*, 3*b* is also arranged on the housing upper side 5.

The respective insertion opening 3*a*, 3*b* also extend into a first housing chamber 4*a* and a second housing chamber 4*b*. The respective housing chamber 4*a*, 4*b* also has a first connection device 6*a* and a second connection device 6*b* which are arranged rotationally symmetrically relative to one another in the respective housing chamber 4*a*, 4*b* of the housing half 8*a*, 8*b*.

Figure 2A:
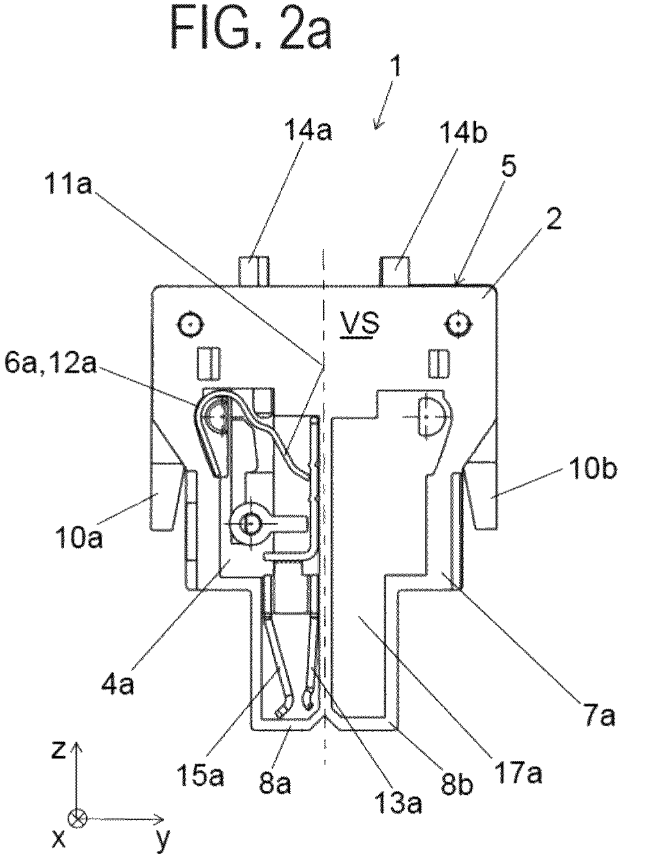
FIG. 2*a* is a front view of a first plug connector of a second embodiment of a plug connector according to the invention.

As depicted in FIG. 2*a*, the housing 2 of the plug connector 1 also has on its front side VS a first housing wall 7*a* which closes the second housing chamber 4*b* which here is arranged on the right in FIG. 2*a*. In contrast, the first housing chamber 4*a*, which in FIG. 2*a* is arranged on the left on the front side VS of the housing 2, is open such that the first connection device 6*a* is visible.

Figure 2B:
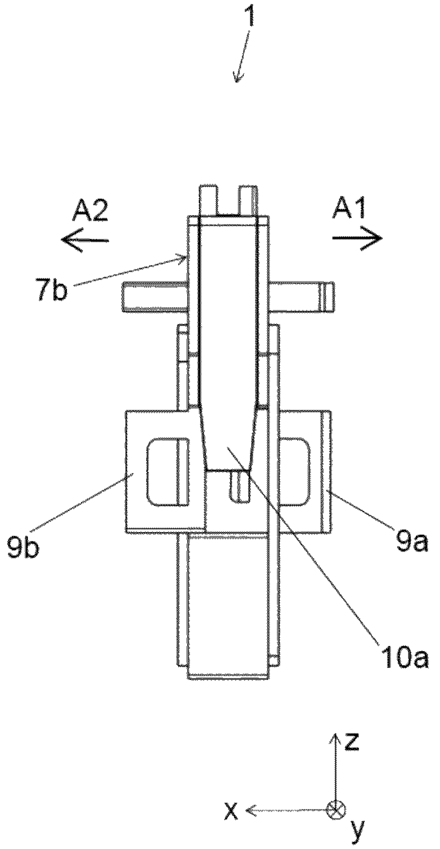
FIG. 2*b* is a side view of the plug connector from FIG. 2*a;*
Figure 2C:
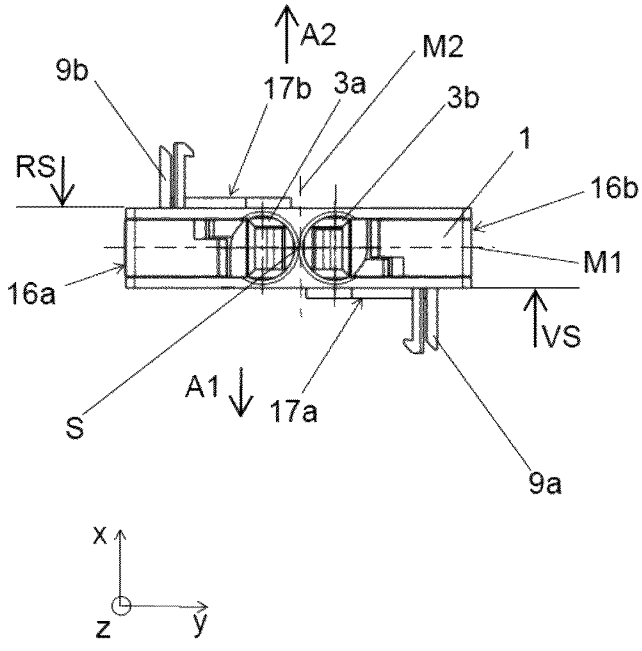
FIG. 2*c* a plan view of the plug connector from FIG. 2*a;*

As shown in FIGS. 2*b* and 2*c*, the housing 2 of the plug connector 1 has on its rear side RS a second housing wall 7*b* which likewise closes one of the two housing chambers, namely the first housing chamber 4*a*. The first housing chamber 4*a* is arranged to the right in the direction of view onto the rear side RS of the housing 2. In contrast, the second housing chamber 4*b*, which is arranged to the left in the direction of view onto the rear side RS, is open.

In contrast to the exemplary embodiment according to FIGS. 1*a*-1*f*, the housing 2 of FIGS. 2*a*-2*e* has a planar thickening 17*a*, 17*b* of the housing wall in front of the respective housing wall 7*a*, 7*b*. The respective thickening 17*a*, 17*b* of the housing wall thickens each housing wall 7*a*, 7*b*.

The geometry of the respective thickening 17*a*, 17*b* of the housing wall is formed like a protrusion such that it fits in a substantially form-fitting manner into a respective corresponding opening or recess of the adjacent housing 2.

Figure 2D:
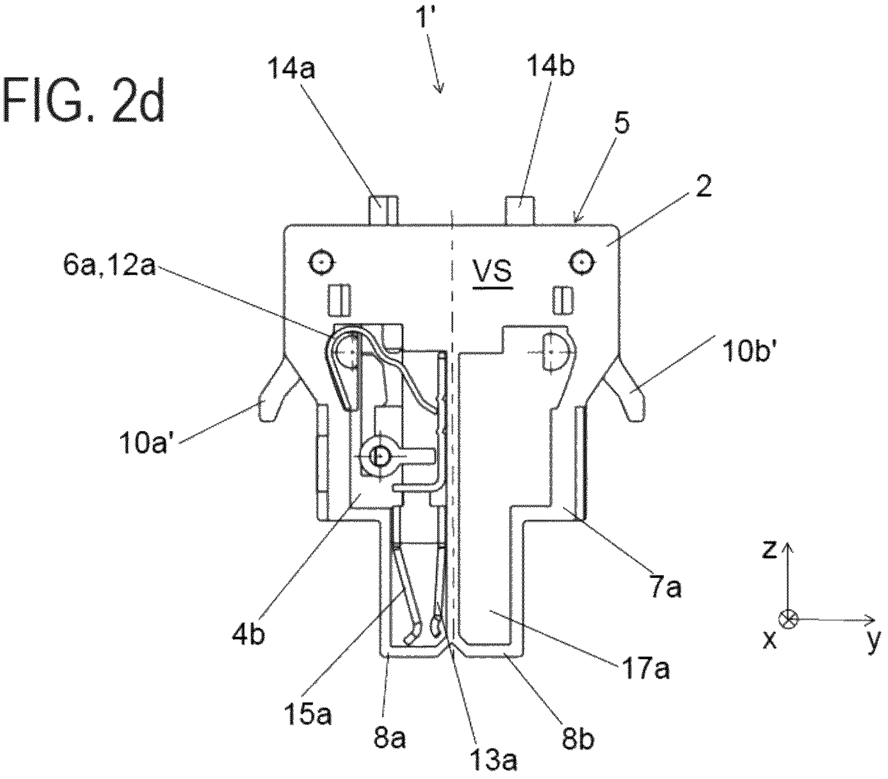
FIG. 2*d* is a front view of a second plug connector of the second embodiment of a plug connector according to the invention.
Figure 2E:
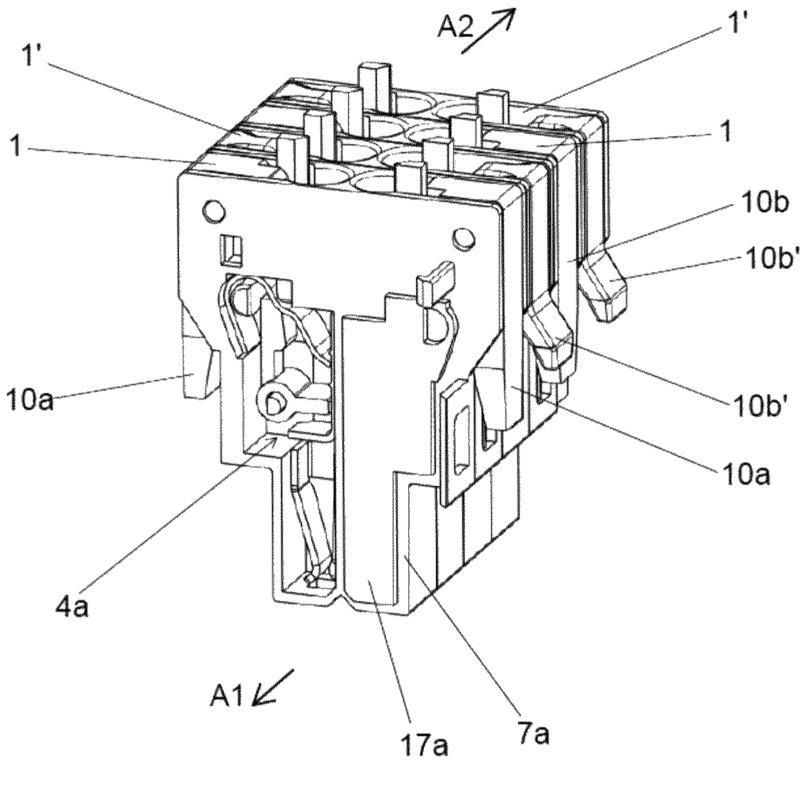
FIG. 2*e* is a perspective view of joined-together plug connectors from FIG. 2*a* and FIG. 2*d;*

FIG. 2*d* depicts the plug connector 1' according to the second exemplary embodiment, in each case with an actuation device 10*a'*, 10*b'*. The respective lever of the actuation device 10*a'*, 10*b'*, in contrast to the design according to FIG. 2*a* to FIG. 2*c*, is formed in an outwardly angled manner. It is envisaged that, in an alternating manner, the plug connector 1 is joined on with the respective actuation device 10*a*, 10*b* according to FIGS. 2*a* to 2*c* and the plug connector 1' is joined on with the actuation device 10*a'*, 10*b'* according to FIG. 2*d*, as is depicted in FIG. 2*e*. As a result, the respective actuation device 10*a*, 10*b* or 10*a'*, 10*b'* is better able to be achieved and handled.

The first housing chamber 4*a*, on the front side VS of the housing 2—to the left in FIG. 2*a*—, is closed in that a second plug connector 1' according to FIG. 2*d* is joined on with its geometrically identical housing 2' on the front side VS of the plug connector 1, which is already joined on, in a first joining-on direction A1—i.e. in a negative x-direction with regard to the coordinate system in FIG. 2*a*, onto the housing 2 of the first plug connector 1 depicted in FIG. 2*a*, as is depicted in FIG. 2*e*.

Analogously to this, the second housing chamber 4*b* is closed on the rear side RS of the housing 2, in that a third plug connector 1" (see FIG. 2*e*), which is geometrically identical to the second plug connector 1', is joined on with its housing 2" on the rear side RS of the plug connector 1', which is already joined on in a second joining-on direction A2 onto the housing 2 of the first plug connector 1 depicted in FIG. 2*a*.

Through the housing 2, which is open over half of the side, both on the front side VS and on the rear side RS of the housing 2, the plug connector 1 according to FIG. 2*a*-2*e* can advantageously be joined together in two different joining-on directions A1, A2.

The first joining-on direction A1 extends in the negative x-direction with regard to the coordinate system in FIG. 2*a*. The second joining-on direction A2 extends in the positive x-direction with regard to the coordinate system in FIG. 2*a*.

As a result, there arises a flexible, simple assembly and a high degree of use of identical parts irrespective of the joining-on direction A1, A2 in which the next plug connector 1 is intended to be joined on since the geometrically identical housing 2 can be used.

In this way, a plug connector 1 is made available which makes it possible to join on additional plug connectors 1', 1" in two joining-on directions and accordingly is flexible in use. Furthermore, the conductor connection takes place from the housing upper side 5 (see in particular FIG. 2*c* and FIG. 2*e*), such that the conductor connection is spatially separated from the actuation device 10*a*, 10*b* for the respective connection device 6*a*, 6*b*, which is also advantageous. Furthermore, the two connection devices 6*a*, 6*b* are oriented to an outer narrow side 16*a*, 16*b* of the housing 2, as a result of which the danger of undesired electrical shunts is advantageously reduced.

FIGS. 3*a* to 3*k* depict a third exemplary embodiment of the plug connector 1.

The plug connector 1 according to this embodiment also has a substantially symmetrical housing 2 with at least two, and here precisely two, insertion openings 3*a*, 3*b* for the conductor ends. The respective insertion opening 3*a*, 3*b* is also arranged on the housing upper side 5.

The respective insertion opening 3*a*, 3*b* also extend into a first housing chamber 4*a* and a second housing chamber 4*b*.

Figure 3A:
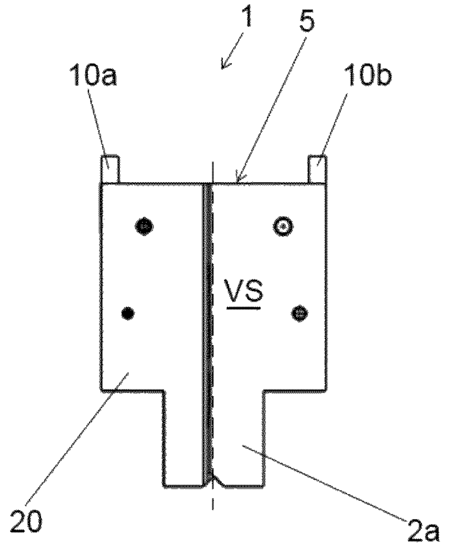
FIG. 3*a* is a front view of a third embodiment of a plug connector according to the invention.
Figure 3B:
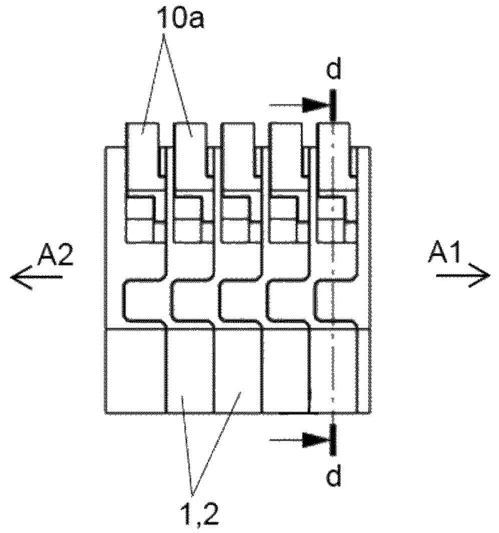
FIG. 3*b* is a side view of the plug connector from FIG. 3*a;*
Figure 3C:
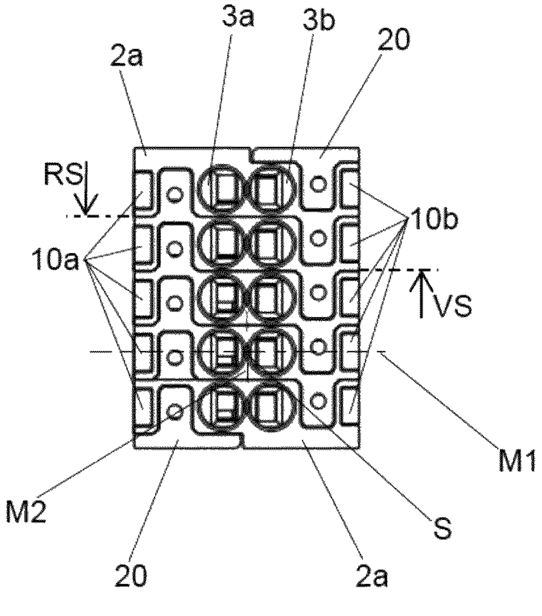
FIG. 3*c* is a plan view of the plug connector from FIG. 3*a;*
Figure 3D:
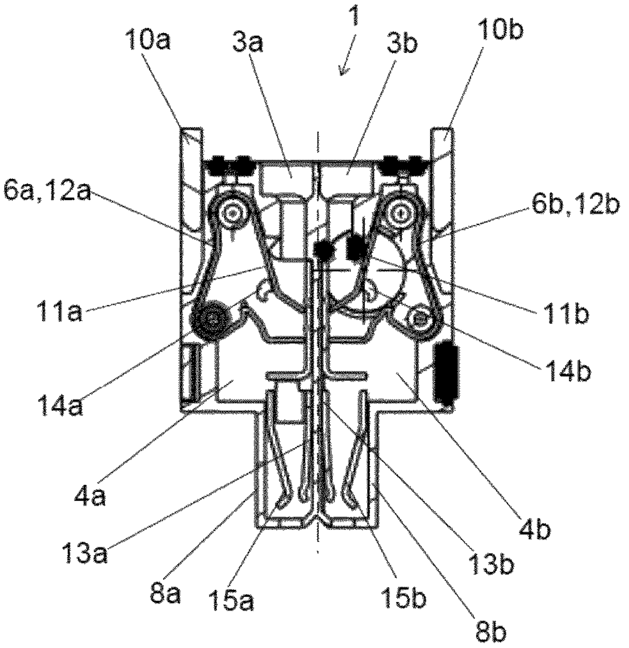
FIG. 3*d* is a sectional front view of the plug connector from FIG. 3*a;*

The respective housing chamber 4*a*, 4*b* also has a first connection device 6*a* and a second connection device 6*b* which are arranged rotationally symmetrically relative to one another in the respective housing chamber 4*a*, 4*b*, as is depicted in FIG. 3*d*.

As depicted in FIGS. 3*h* and 3*i*, the housing 2 of the plug connector 1 has on its front side VS a first housing wall 7*a* which closes the second housing chamber 4*b* arranged on the right. In contrast, the first housing chamber 4*a*, which is arranged on the left on the front side VS of the housing 2, is open such that the first connection device 6*a* is visible.

The housing 2 of the plug connector 1 has on its rear side RS a second housing wall 7*b* which likewise closes one of the two housing chambers, namely the first housing chamber 4*a*. The first housing chamber 4*a* is arranged to the right in the direction of view onto the rear side RS of the housing 2. In contrast, the second housing chamber 4*b*, which is arranged to the left in the direction of view onto the rear side RS, is open.

In contrast to the housing 2 of the plug connector 1 according to FIGS. 1*a*-1*f*, the housing 2 can in turn have a thickening 17*a*, 17*b*, similar to the thickening 17*a*, 17*b* of the housing according to FIGS. 2*a*-2*e*. However, the thickening 17*a*, 17*b* of this embodiment is designed to be thicker than in FIGS. 2*a*-2*e*. The two insertion openings 3*a*, 3*b* are arranged beside one another, as in the embodiment of FIGS. 1*a*-1*f*, with regard to the y-direction according to the coordinate system in FIGS. 3*h*-3*k*.

The geometry of the respective thickening 17*a*, 17*b* of the housing wall is such that it forms a bearing site 18*a*, 18*b* for a pivot bearing 19*a*, 19*b* of the actuation device 10*a*, 10*b*, which is a lever here.

As shown in FIGS. 3*h* and 3*i*, the first housing chamber 4*a* on the front side VS of the housing 2 is closed by a second plug connector 1', which is joined on to the front side with its geometrically identical housing 2'.

Analogously to this, the second housing chamber 4*b* is closed on the rear side RS of the housing 2 by a third plug connector 1" (see FIG. 3*h* and FIG. 3*i*), which is geometrically identical to the second plug connector 1' and is joined on with its housing 2" on the rear side RS of the plug connector 1', which is already joined on in a second joining-on direction A2 to the housing 2 of the first plug connector 1 depicted in FIG. 3*h* and FIG. 3*i*.

Through the housing 2, which is open over half of the side both on the front side VS and on the rear side RS of the housing 2, the plug connector 1 according to FIGS. 3*a*-3*k* can advantageously be joined together in two different joining-on directions A1, A2.

Likewise in contrast to the embodiment according to FIGS. 1*a*-1*f*, a separate housing end 2*a* is provided here as a termination of joined-on plug connectors 1, as is depicted in FIG. 3*j*. The housing chamber 4*a*, which is also open at the housing end 2*a*, is closed by an additional cover cap 20, as is depicted in FIGS. 3*a*-3*c* and in FIG. 3*k*.

Figure 3E:
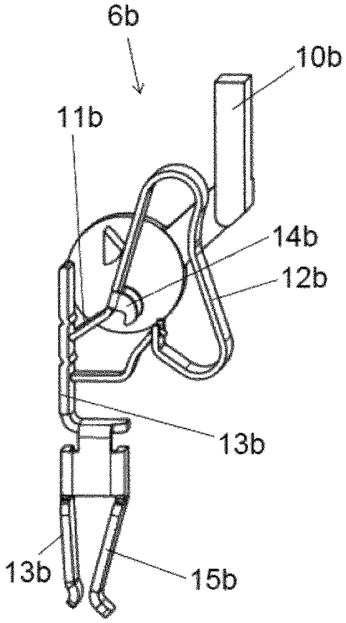
FIG. 3*e* is a perspective view of an actuation device in a starting position and contacting a conductor.
Figure 3F:
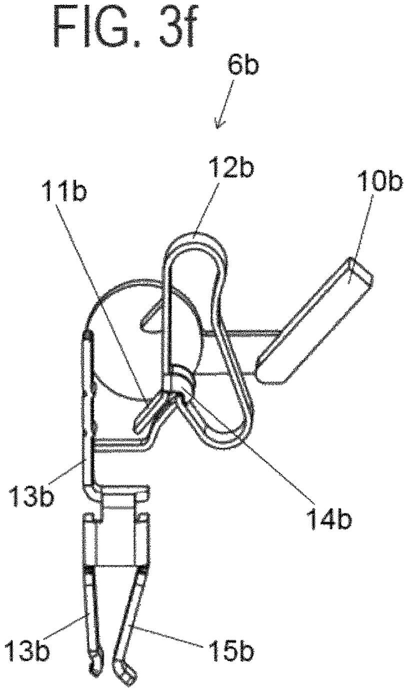
FIG. 3*f* is a perspective view of the connection device being prestressed by the actuation device.
Figure 3G:
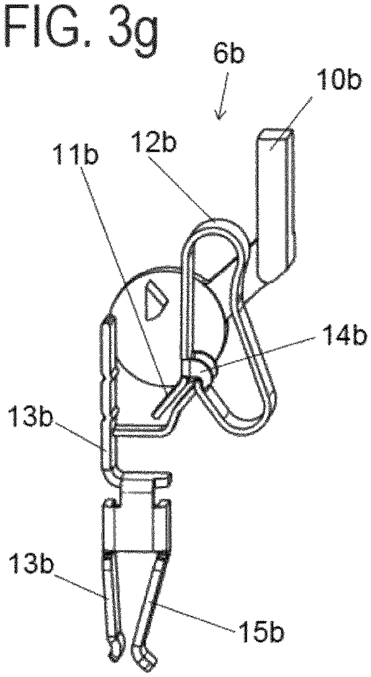
FIG. 3*g* is a perspective view of the connection device being prestressed by the actuation device with the actuation device in the home position.

FIGS. 3*e*-3*g* depict a perspective view of the actuation device 10*a, b* with the connection device 6*a*, 6*b*. FIG. 3*e* depicts the actuation device 10*a*, 10*b* with the connection device 6*a*, 6*b* in a position in which the actuation device 10*a*, 10*b* is in a home position and the connection device 6*a*, 6*b* could contact a conductor. FIG. 3*f* depicts the actuation device 10*a*, 10*b* in a position in which the connection device 6*a*, 6*b* is prestressed in an open position by the actuation device 10*a*, 10*b*. FIG. 3*g* depicts the actuation device 10*a*, 10*b* in a position in which the connection device 6*a*, 6*b* is prestressed and the actuation device 10*a*, 10*b* is in the home position.

In this way, a plug connector is made available which makes it possible to join on additional plug connectors 1', 1" in two joining-on directions and accordingly is flexible in use. Furthermore, the conductor connection takes place from the housing upper side 5 (see in particular FIG. 3*c* and FIG. 3*h*-3*k*), such that the conductor connection is spatially separated from the actuation device 10*a*, 10*b* for the respective connection device 6*a*, 6*b*, which is also advantageous. Furthermore, the two connection devices 6*a*, 6*b* are in each case oriented to an outer narrow side 16*a*, 16*b* of the housing 2, as a result of which the danger of undesired electrical shunts is advantageously reduced.

The invention claimed is:

1. A plug connector for contacting a mating plug connector, the plug connector comprising a housing made of an electrically non-conductive material having a front side and a rear side, the housing having at least two insertion openings for conductor ends, the first insertion opening being in connection with a first housing chamber and the second insertion opening being in connection with a second housing chamber, the first housing chamber including a first connection device and the second housing chamber including a second connection device, the housing having a first housing half and a second housing half, wherein the first housing half is rotationally symmetrical to the second housing half such that the housing is formed in a rotationally symmetrical manner with regard to a point of symmetry or an axis of symmetry on which a point of symmetry is situated, the housing further having on its front side a first housing wall which closes the second housing chamber and on its rear side a second housing wall which closes the first housing chamber, the first housing chamber of the front side and second housing chamber of the rear side remaining open.

2. The plug connector according to claim 1, wherein the two housing halves are aligned by a 180° rotation relative to one another.

3. The plug connector according to claim 1, wherein the two housing halves are integrally connected to one another.

4. The plug connector according to claim 1, wherein the point of symmetry is situated on an imaginary point of intersection of two center lines which respectively bisect a length and a width with regard to an upper side of the housing.

5. The plug connector according to claim 1, wherein at least one of the insertion openings is arranged on an upper side of the housing.

6. The plug connector according to claim 1, wherein the first and second connection devices are arranged rotationally symmetrical relative to one another.

7. The plug connector according to claim 1, wherein the front side of the housing is configured for connection with a first geometrically identical plug connector which can be joined on with the housing front side, wherein when joined on the first geometrically identical plug connector closes the first housing chamber.

8. The plug connector according to claim 7, wherein the rear side of the housing is configured for connection with a second geometrically identical plug connector which can be joined on with the housing rear side, wherein when joined on the second geometrically identical plug connector closes the second housing chamber.

9. The plug connector according to claim 8, wherein the housing has one or more form-fitting elements per housing half, the form-fitting elements being formed such that when the first and second geometrically identical plug connectors are joined on with the plug connector, the form-fitting elements engage adjacent form-fitting elements of the first and second geometrically identical plug connectors in a form-fitting manner.

10. The plug connector according to claim 9, wherein each housing half has at least one locking arrangement, the at least one locking arrangement including a locking hook or a latch, the at least one locking arrangement being formed such that when two or more plug connectors are joined together locking arrangements of adjacent housings of respective plug connectors engage one another in a locking manner.

11. The plug connector according to claim 1, wherein the respective connection devices are designed as a spring-loaded direct plug contact.

12. The plug connector according to claim 1, wherein the respective connection devices are formed as a tension spring connection, as a screw connection or as an insulation-penetrating connection.

13. The plug connector according to claim 1, wherein the respective connection devices have an actuation device to open, prestress, or open and prestress a contact limb of a contact spring of the connection device.

14. The plug connector according to claim 13, wherein the actuation devices is formed as a lever pivotably mounted in the housing, as a sliding element, or as a combination of these elements.

15. The plug connector according to claim 1, including an elongated first busbar section connected to a plug contact at which the plug connector is configured for contact with a mating plug connector.

16. The plug connector according to claim 1, and further including at least one cover plate connected with the housing to cover the first housing chamber or the second housing chamber, wherein the at least one cover plate is connected with a plug connector arranged at and end of a row of plug connectors.

17. The plug connector according to claim 1, wherein the housing (2) has at least one housing wall having a planar thickening.

18. The plug connector according to claim 17, wherein the geometry of the planar thickening of the at least one housing wall is formed such that it can fit in a housing opening of a corresponding plug connector housing in a substantially form-fitting manner.

19. The plug connector according to claim 13, wherein the actuation device has a lever that is angled outward and extending from the housing when in a home position.

20. The plug connector according to claim 19, wherein the lever of the actuation device is oriented parallel to the housing when in a starting position.

21. The plug connector according to claim 19, wherein the lever of the actuation device is oriented at an angle relative to the housing when in a starting position.

22. The plug connector according to claim 17, wherein the thickening of the at least one housing wall is configured to form a bearing site for a pivot bearing of the actuation device.

23. The plug connector according to claim 1, further including a cover cap for closing at least one of the housing chambers.

24. A row of plug connectors according to claim 1.

25. The row according to claim 24, including a housing end as a termination of joined-together plug connectors.

26. The row according to claim 25, wherein plug connectors are joined together such that a lever of each plug connector actuation device alternates between being oriented parallel to and being oriented at angle to the housing when in a starting position.

* * * * *